(12) United States Patent
Bolte et al.

(10) Patent No.: US 7,186,312 B1
(45) Date of Patent: Mar. 6, 2007

(54) ADHESIVE WHICH HARDENS IN SEVERAL STAGES

(75) Inventors: Gerd Bolte, Monheim (DE); Andreas Ferencz, Duesseldorf (DE); Markus Kruedenscheidt, Langenfeld (DE); Thomas Offergeld, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/719,928

(22) PCT Filed: Jun. 12, 1999

(86) PCT No.: PCT/EP99/04066

§ 371 (c)(1),
(2), (4) Date: Feb. 27, 2001

(87) PCT Pub. No.: WO99/67340

PCT Pub. Date: Dec. 29, 1999

(30) Foreign Application Priority Data

Jun. 19, 1998 (DE) ............. 198 27 494
Oct. 1, 1998 (DE) ............. 198 45 180

(51) Int. Cl.
*C09J 101/00* (2006.01)
(52) U.S. Cl. ............. 156/331.7; 156/275.5; 525/458; 522/34; 522/35; 522/96
(58) Field of Classification Search ............. 525/458, 525/454; 156/275.5, 275.7, 331.7; 428/423.1; 522/34, 35, 36, 39, 90, 96, 97, 174, 92
See application file for complete search history.

(56) References Cited

U.S. PATENT DOCUMENTS

| | | | | |
|---|---|---|---|---|
| 3,368,988 A | * | 2/1968 | Sekmakas ............. | 525/454 |
| 5,018,337 A | * | 5/1991 | Carter et al. ............. | 53/458 |
| 5,100,995 A | * | 3/1992 | Munzmay et al. ............. | 528/45 |
| 5,227,213 A | | 7/1993 | Komori et al. | |
| 5,478,427 A | | 12/1995 | Huver et al. | |
| 5,866,656 A | * | 2/1999 | Hung et al. ............. | 525/455 |
| 5,900,444 A | * | 5/1999 | Zamore ............. | 525/455 |
| 5,965,662 A | | 10/1999 | Krebs et al. | |

FOREIGN PATENT DOCUMENTS

| | | |
|---|---|---|
| DE | 29 13 676 | 10/1980 |
| DE | 195 41 923 | 5/1997 |
| EP | 175474 A2 * | 3/1986 |
| EP | 0 380 178 | 8/1990 |
| EP | 0 455 400 | 11/1991 |
| EP | 0 485 008 | 5/1992 |
| EP | 603046 A1 * | 6/1994 |
| EP | 0 604 949 | 7/1994 |
| EP | 0 564 483 | 1/1996 |
| JP | 05214315 A * | 8/1993 |
| WO | WO95/32230 | 11/1995 |
| WO | WO98/20087 | 5/1998 |

OTHER PUBLICATIONS

Abstract of JP 05214314.*
Machine translation of JP 05214314.*
Abstract of EP 603046.*
English translation EP603046.*

* cited by examiner

*Primary Examiner*—Jeff H. Aftergut
*Assistant Examiner*—John L. Goff
(74) *Attorney, Agent, or Firm*—Stephen D. Harper; Glenn E. Murphy; Daniel S. Ortiz

(57) ABSTRACT

A hotmelt adhesive having a melting point of at least 40° C. is provided which may be hardened in multiple stages and which is useful in the production of laminates. The hotmelt adhesive may contain a polymer with at least one functional group that is reactive towards a compound with an acidic hydrogen atom and with one functional group that can be polymerized by UV or electron beams, or a polymer with at least one functional group that is reactive towards a compound with an acidic hydrogen atom and with no functional group that can be polymerized by UV or electron beams. These polymers may be used in combination with a relatively low molecular compound with a functional group that can be polymerized by UV or electron beams.

20 Claims, No Drawings

ADHESIVE WHICH HARDENS IN SEVERAL STAGES

BACKGROUND OF THE INVENTION

1. Field of the Invention

This invention relates to a hotmelt adhesive with a melting point of at least 40° C. which contains either a polymer having at least one functional group reactive to a compound with an acidic hydrogen atom and a functional group polymerizable by exposure to UV light or to electron beams or a polymer having at least one functional group reactive to a compound with an acidic hydrogen atom but no functional group polymerizable by exposure to UV light or electron beams and a compound with a functional group polymerizable by exposure to UV light or electron beams and a molecular weight ($M_n$) of less than 5,000.

2. Discussion of the Related Art

The machine production of laminates, particularly laminated films, is often carried out in practice by lamination with solvent-containing adhesives. Unfortunately, this is attended by various disadvantages.

If solvent-containing adhesives are used for lamination, considerable quantities of solvent generally have to be evaporated during lamination which involves high energy consumption. In addition, the waste air accumulating during evaporation of the solvent has to be purified at considerable expense in order to avoid the discharge of solvent vapors into the atmosphere. In addition, solvent-containing adhesives have the disadvantage that, as a rule, they only develop adequate strength after passing through a drying stage, i.e. after at least the predominant quantity of solvent present in the adhesive has been evaporated.

On the other hand, however, the processability of an adhesive is seriously affected by the absence of solvent. Adhesives suitable for the production of laminates are intended first and foremost to have a suitable application or processing viscosity, but to release only minimal quantities of readily volatile substances into the environment. In addition, adhesives of the type in question are generally expected to have sufficiently good early adhesion immediately after application to at least one of the materials to be joined after they have been fitted together so that the bonded materials are prevented from shifting relative to one another. In addition, however, a corresponding bond is also expected to be sufficiently flexible to withstand the various tensile and offset yield stresses to which the laminate—still at the processing stage—is generally exposed without damage to the adhesive bond or to the bonded material.

The early adhesion of the bonded materials has to satisfy particularly stringent requirements when not only thin films, but also materials which, although showing increased tensile strength, also have much greater flexural rigidity, for example sheet-form plastics with a thickness of more than about 100 μm or laminates which contain, for example, a paperboard layer and which, in general, are also more than 100 μm thick, are laminated to one another. With laminates such as these, the adhesive bond is exposed to particularly severe stressing because even light bending forces are transmitted virtually unweakened to the bond through the high flexural rigidity of the laminate. In general, conventional adhesives, because of their poor early adhesion, are unable to withstand the strong forces occurring at the bond without damage, even shortly after application.

Besides excellent early adhesion, various applications, particularly in the packaging of foods, make other demands on the quality of the adhesive bond. Thus, after curing, the adhesive bond is expected to show such high strength that packaged foods, for example, withstand without damage the increased stresses to which they are exposed, for example, during transportation or sale or by the user. In addition, the adhesive bonds in question are expected to show excellent heat resistance because foods are often packaged while they are warm or even hot with temperatures of up to about 100° C. If the adhesive bond of a food pack is not sufficiently heat-resistant in such cases, it can be damaged during the packaging process or during the cooling phase of the food, with the result that, for example, the food leaks from the pack. However, even minute cracks in the adhesive bond can be harmful to the food intended for sale, for example by allowing microorganisms to penetrate into the pack and to spoil the food.

In general, a fundamental disadvantage of the conventional solventless adhesives known from the prior art is that the adhesion properties of the adhesive after application are unsatisfactory on account of the low viscosity, so that the adhesive bond must not be exposed to any stresses before final curing to ensure that the laminate retains the intended shape. Such adhesives are generally unsuitable for the production of laminates with increased flexural rigidity. In addition, the adhesives in question generally require long cure times which often makes the production of laminates using such adhesives uneconomical.

One proposal for avoiding the disadvantages described above was to use an adhesive system hardening in several stages in the production of laminates. The adhesives used in this case were subjected in a first stage to a first rapid curing reaction by irradiation. The strength of the adhesive bond after this first curing reaction is said to be such that it enables the bonded articles or materials to be handled without difficulty. In a second curing stage, the adhesive then continues to harden until it has the required ultimate strength.

DE-A-29 13 676, for example, discloses a process for the production of film laminates using solventless adhesives. This document describes a solventless adhesive liquid at room temperature which consists of oligomeric and/or polymeric esters and/or ethers containing both free isocyanate groups and free (meth)acrylate groups in one molecule.

Unfortunately, this process is attended by the disadvantage that, although the strength of the bond is sufficient for bonding thin, flexible materials with minimal flexural rigidity, early adhesion is generally not sufficient for firmly bonding laminates of relatively thick, stiff materials in the early phase.

EP-B 0 564 483 describes reactive contact adhesives, processes for their production and their use. More particularly, this document describes urethane-based coating compositions polymerizable in two stages which, through the presence of UV-polymerizable acrylate groups, can be cured in a first curing stage to form a hard, but still formable or embossable material which then undergoes irreversible hardening in a following second stage. Monofunctional acrylates are added to the adhesive to lower its viscosity. The described adhesive has contact tackiness after irradiation. The bonding of wood and/or plastic parts at up to about 70° C., preferably at room temperature, is mentioned as one application of the described contact adhesive.

SUMMARY OF THE INVENTION

The problem addressed by the present invention was to provide an adhesive which would be suitable for the production of laminates, more particularly for the production of laminates with high flexural rigidity, and which would immediately show strong early adhesion after application and which would lead after complete curing to laminates combining excellent strength values with high heat resistance.

The problem addressed by the invention is solved by a hotmelt adhesive with a melting point of at least 40° C. as described in the following.

The present invention relates to a hotmelt adhesive with a melting point of at least 40° C. containing a component A or a component A and a component B or a component B and a component C or a component A and a component C or components A, B and C, a) component A being a polymer with a molecular weight ($M_n$) of at least 5,000 which contains at least one functional group reactive to a compound containing an acidic hydrogen atom and a functional group polymerizable by exposure to UV rays or electron beams, b) component B being a polymer with a molecular weight ($M_n$) of at least 5,000 which contains at least one functional group reactive to a compound containing an acidic hydrogen atom and no functional group polymerizable by exposure to UV light or electron beams and c) component C being a compound containing a functional group polymerizable by exposure to UV light or electron beams and having a molecular weight of less than 5,000.

DETAILED DESCRIPTION OF THE INVENTION

The term "melting point" cannot generally be clearly defined in the case of compositions which can contain several components with partly differing molecular weights. Accordingly, in the context of the present invention, the term "melting point" is used for the temperature at which a shaped body consisting of the adhesive according to the invention loses its dimensional stability, i.e. it completely loses its original external shape after about one minute to about one hour, for example after about 5 minutes or about 15 minutes or about 30 minutes or about 45 minutes (possibly depending on the quantity used), at the temperature referred to as its melting point.

In one preferred embodiment, the composition according to the invention has a melting point of at least about 60° C., for example at least about 70° C. or at least about 80° C. In special cases, the melting point can be even higher, for example at least about 90° C. or at least about 100° C.

The adhesive according to the invention contains a combination of components A, B and C, as individually mentioned in the foregoing.

"Component A" in the context of the present invention is a polymer with a molecular weight ($M_n$) of at least about 5,000 which contains at least one functional group reactive to a compound containing an acidic hydrogen atom and a functional group polymerizable by exposure to UV light or electron beams.

A compound containing an acidic hydrogen atom is understood to be a compound which contains an active hydrogen atom attached to an N, O or S atom and determinable by the Zerewitinoff test. The active hydrogen atom includes the hydrogen atoms of water, carboxy, hydroxy, amino, imino and thiol groups. According to the invention, water is particularly preferred as the compound containing an acidic hydrogen atom. Compounds containing amino or OH groups or both or mixtures of two or more of the compounds mentioned are also preferred.

Suitable functional groups reactive with a compound containing an acidic hydrogen atom are, in particular, NCO, epoxy, anhydride or carboxyl groups. According to the invention, NCO groups and epoxy groups or mixtures thereof are preferred. Besides the other necessary features, a polymer usable as component A in accordance with the present invention may contain, for example, only one functional group reactive to a compound containing an acidic hydrogen atom. However, a compound containing two or more such functional groups may also be used as component A. If the corresponding polymer contains two or more such functional groups, the functional groups may be of one type, i.e. for example only NCO groups or only epoxy groups, although the polymer may also contain mixtures of different functional groups of the type mentioned, for example NCO groups and epoxy groups or NCO groups and epoxy groups and one or more other functional groups of the type already mentioned, for example one or more anhydride groups or one or more carboxyl groups.

According to the invention, the isocyanate group or the epoxy group, preferably the isocyanate group, is particularly suitable as the functional group capable of reacting with a compound containing at least one acidic hydrogen atom.

The composition according to the invention contains at least one polymer with a molecular weight of at least about 5,000 as component A. Polymers suitable for use as component A are, for example, polyacrylates, polyesters, polyethers, polycarbonates, polyacetals, polyurethanes, polyolefins or rubber polymers, such as nitrile or styrene/butadiene rubbers, providing they contain at least one functional group polymerizable by exposure to UV light or to electron beams and at least one functional group capable of reacting with a compound containing at least one acidic hydrogen atom.

However, polyacrylates, polyesters or polyurethanes, particularly polyesters or polyurethanes, are preferably used as polymers in the composition according to the invention because the polymers mentioned make it particularly easy to attach the functional groups required in accordance with the invention to the polymer molecule.

The polymers mentioned can be produced particularly easily from a compound referred to in the following as the "basic" polymer or from a mixture of two or more such compounds containing at least two isocyanate-, epoxy-, carboxyl or anhydride-reactive functional groups, preferably NH or OH groups, in the polymer molecule. The required functional group can be attached particularly easily to this basic polymer by reaction with suitably functionalized isocyanates, epoxides, carboxylic acids or anhydrides. According to the invention, an OH-terminated polymer is preferably used as the "basic" polymer.

Accordingly, one example of a polymer suitable for use as the basic polymer is a polymer selected from the group consisting of polyesters, polyethers, polycarbonates or polyacetals with a molecular weight ($M_n$) of at least about 200 or mixtures of two or more such polymers which contain terminal OH groups.

Polyesters suitable for use as the basic polymer in accordance with the invention may be obtained in known manner by polycondensation of acid and alcohol components, more particularly by polycondensation of a polycarboxylic acid or a mixture of two or more polycarboxylic acids and a polyol or a mixture of two or more polyols.

Polycarboxylic acids suitable in accordance with the present invention for the production of the basic polymer may be based on an aliphatic, cycloaliphatic, araliphatic, aromatic or heterocyclic parent compound and, besides the at least two carboxylic acid groups, may optionally contain one or more substituents which do not react in the course of a polycondensation reaction, for example halogen atoms or olefinically unsaturated double bonds. The free carboxylic acids may even be replaced by their anhydrides (where they exist) or esters with $C_{1-5}$ monoalcohols or mixtures of two or more thereof for the polycondensation reaction.

Suitable polycarboxylic acids are, for example, succinic acid, adipic acid, suberic acid, azelaic acid, sebacic acid, glutaric acid, glutaric anhydride, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimer fatty acids or trimer fatty acids or mixtures of two or more thereof.

Small quantities of monofunctional fatty acids may optionally be present in the reaction mixture.

Various polyols may be used as the diols for producing a polyester or polycarbonate suitable for use as the basic polymer. Examples of such polyols are linear or branched, saturated or unsaturated aliphatic polyols containing 2 to about 10 and preferably about 2 to about 4 OH groups per molecule. These OH groups may be both primary and secondary OH groups.

Suitable aliphatic polyols include, for example, ethylene glycol, propane-1,2-diol, propane-1,3-diol, butane-1,4-diol, butane-1,3-diol, butane-2,3-diol, butene-1,4-diol, butine-1,4-diol, pentane-1,5-diol, and the isomeric pentanediols, pentenediols or pentinediols or mixtures of two or more thereof, hexane-1,6-diol and the isomeric hexanediols, hexenediols or hexinediols or mixtures of two or more thereof, heptane-1,7-diol and the isomeric heptane, heptene or heptinediols, octane-1,8-diol and the isomeric octane, octene or octinediols and higher homologs or isomers of the compounds mentioned, which are obtained in known manner from a step-by-step extension of the hydrocarbon chain by one $CH_2$ group at a time or by introducing branches into the carbon chain, or mixtures of two or more thereof.

Other suitable polyols for the production of the basic polymer are alcohols of relatively high functionality, such as glycerol, trimethylol propane, triethylol propane, pentaerythritol and mono-, oligo- or polymeric saccharides, such as glucose, fructose, galactose, arabinose, ribose, xylose, lyxose, allose, altrose, mannose, gulose, idose, talose and sucrose. Also suitable are the oligomeric ethers of the substances mentioned either as such or in the form of a mixture of two or more of the compounds mentioned with one another, for example polyglycerol with a degree of polymerization of about 2 to about 4. In the alcohols of relatively high functionality, one or more OH groups may be esterified with monobasic carboxylic acids containing 1 to about 20 carbon atoms, with the proviso that, on average, at least two OH groups remain intact. The alcohols mentioned with a functionality of more than 2 may be used in pure form or, where possible, in the form of the technical mixtures obtainable in the course of their synthesis.

The reaction products of low molecular weight polyfunctional alcohols with alkylene oxides, so-called polyether polyols, may also be used for the production of the basic polymers. Polyether polyols, which are to be used for the production of polyesters suitable as the basic polymers, are preferably obtained by reaction of polyols with alkylene oxides. The alkylene oxides preferably contain 2 to about 4 carbon atoms. Suitable polyether polyols are, for example, the reaction products of ethylene glycol, propylene glycol, the isomeric butanediols or hexanediols, as mentioned above, or mixtures of two or more thereof with ethylene oxide, propylene oxide or butylene oxide or mixtures of two or more thereof. Other suitable polyether polyols are products of the reaction of the above-mentioned alcohols with a functionality of more than 2 or mixtures of two or more thereof with the alkylene oxide mentioned to form polyether polyols. Polyether polyols with a molecular weight ($M_n$) of about 80 to about 3,000, preferably in the range from about 100 to about 2,500 and most preferably in the range from about 200 to about 2,000 obtainable from the reactions mentioned are particularly suitable. The polyether polyols mentioned may be reacted with the polycarboxylic acids mentioned above in a polycondensation reaction to form the polyesters suitable for use as the basic polymers.

Polyether polyols formed, for example, as described above are also suitable as the basic polymers. Polyether polyols are normally obtained by reacting a starting compound containing at least two reactive hydrogen atoms with alkylene or arylene oxides, for example ethylene oxide, propylene oxide, butylene oxide, styrene oxide, tetrahydrofuran or epichlorohydrin or mixtures of two or more thereof.

Suitable starting compounds are, for example, water, ethylene glycol, 1,2- or 1,3-propylene glycol, 1,4- or 1,3-butylene glycol, 1,6-hexanediol, 1,8-octanediol, neopentyl glycol, 1,4-hydroxymethyl cyclohexane, 2-methylpropane-1,3-diol, glycerol, trimethylol propane, hexane-1,2,6-triol, butane-1,2,4-triol, trimethylol ethane, pentaerythritol, mannitol, sorbitol, methyl glycosides, sugars, phenol, isononyl phenol, resorcinol, hydroquinone, 1,2,2- or 1,1,2-tris-(hydroxyphenyl)-ethane, ammonia, methyl amine, ethylenediamine, tetra- or hexamethylenediamine, triethanolamine, aniline, phenylenediamine, 2,4- and 2,6-diaminotoluene and polyphenyl polymethylene polyamines which can be obtained by condensing aniline with formaldehyde.

Polyether polyols modified by vinyl polymers are also suitable for use as the basic polymer. Products such as these can be obtained, for example, by polymerizing styrene or acrylonitrile or a mixture thereof in the presence of polyethers.

A polyether polyol particularly suitable in accordance with the invention for use as the basic polymer is polypropylene glycol with a molecular weight of about 300 to about 1,500.

Polyacetals are also suitable for use as the basic polymer. Poly-acetals are understood to be compounds obtainable by reacting glycols, for example diethylene glycol or hexanediol, with formaldehyde. Polyacetals suitable for the purposes of the invention may also be obtained by polymerizing cyclic acetals.

Polycarbonates are also suitable for use as the basic polymer or as the polyol used for producing the basic polymer. Polycarbonates may be obtained, for example, by reacting the polyols mentioned above, more particularly diols, such as propylene glycol, butane-1,4-diol or hexane-1,6-diol, diethylene glycol, triethylene glycol or tetraethylene glycol or mixtures of two or more thereof, with diaryl carbonates, for example diphenyl carbonate or phosgene.

OH-functional polyacrylates are also suitable as the basic polymer or as the polyol component used for producing the basic polymer. OH-functional polyacrylates may be obtained, for example, by polymerizing ethylenically unsaturated monomers bearing OH groups. Such monomers are obtainable, for example, by esterification of ethylenically unsaturated carboxylic acids and difunctional alcohols, the alcohol generally being present in only a slight excess. Ethylenically unsaturated carboxylic acids suitable for this purpose are, for example, acrylic acid, methacrylic acid, crotonic acid or maleic acid. Corresponding OH-functional esters are, for example, 2-hydroxyethyl acrylate, 2-hydroxyethyl methacrylate, 2-hydroxy-propyl acrylate, 2-hydroxypropyl acrylate, 2-hydroxypropyl methacrylate, 3-hydroxypropyl acrylate or 3-hydroxypropyl methacrylate or mixtures of two or more thereof.

The basic polymers mentioned may optionally be provided with terminal groups other than terminal OH groups by a suitable choice of the production conditions. Providing the reaction conditions are suitably selected, the polyesters, polyacetals or polycarbonates may have carboxyl groups, for example, as terminal groups or at least as part of the terminal groups. In addition, amino groups, for example, may be introduced into the basic polymers by suitable reactions.

The molecular weight of the basic polymer should be no higher than about 100,000. In one preferred embodiment of the invention, the molecular weight of the basic polymer is in the range from about 200 to about 30,000, for example in the range from about 300 to about 15,000 or from about 500 to about 10,000.

In a preferred embodiment, hotmelt adhesives according to the invention are produced, for example, from basic polymers with a molecular weight ($M_n$) in the range from about 500 to about 5,000, for example in the range from about 700 to about 3,000 or in the range from about 1,000 to about 2,000.

The basic polymers mentioned may be used both individually and in the form of a mixture of two or more of the basic polymers mentioned in the production processes described in the following.

In a first embodiment, the hotmelt adhesive according to the invention contains as component A a polymer with a molecular weight ($M_n$) of at least 5,000 which contains at least one functional group reactive to a compound containing an acidic hydrogen atom and a functional group polymerizable by exposure to UV rays or electron beams.

Where the polymer usable as component A is produced from a basic polymer of which the molecular weight ($M_n$) is sufficiently high, for example about 5,000 or higher, a first production process for component A is described in the following. To this end, the OH-containing basic polymer is preferably reacted with the polyfunctional compound, for example with a polyisocyanate, for example in a molar ratio of 1:>2, the excess of polyfunctional compound being, for example, just large enough to avoid chain extension of the basic polymer, although only small quantities of unreacted polyfunctional compound are present in the reactive component. A procedure such as this can be of advantage in particular where a polyisocyanate is used as the polyfunctional compound. A polymer terminated by two functional groups which can be polymerized by reaction with a compound containing at least one acidic hydrogen atom is obtained in this way.

Suitable polyfunctional isocyanates which are suitable for reaction with the basic polymers for the production of a polymer usable as component A contain on average two to at most about four isocyanate groups. Examples of suitable polyisocyanates are 1,5-naphthylene diisocyanate, 4,4'-diphenyl methane diisocyanate (MDI), hydrogenated MDI (dicyclohexyl methane diisocyanate, $H_{12}$-MDI), xylylene diisocyanate (XDI), tetramethyl xylylene diisocyanate (TMXDI), 4,4'-diphenyl dimethyl methane diisocyanate and di- and tetraalkyl diphenyl methane diisocyanate, 4,4'-dibenzyl diisocyanate, 1,3-phenylene diisocyanate, 1,4-phenylene diisocyanate, 2,4- and 2,6-toluene diisocyanate (TDI) and mixtures thereof, more particularly a mixture containing about 20% of 2,4- and 80% by weight of 2,6-toluene diisocyanate, 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perfluoroethane, tetramethoxy-butane-1,4-diisocyanate, ethylene diisocyanate, 1,2-propane diisocyanate, 1,4-butane diisocyanate, 1,5-pentane diisocyanate, 1,6-hexane diisocyanate (HDI), cyclohexane-1,4-diisocyanate, phthalic acid-bis-isocyanatoethyl ester; polyisocyanates containing reactive halogen atoms, such as 1-chloromethylphenyl-2,4-diisocyanate, 1-bromomethylphenyl-2,6-diisocyanate, 3,3-bis-chloromethylether-4,4'-diphenyl diisocyanate or mixtures of two or more thereof. Sulfur-containing polyisocyanates obtainable, for example, by reacting 2 moles of hexamethylene diisocyanate with 1 mole of thiodiglycol or dihydroxydihexyl sulfide are also suitable. Other diisocyanates are trimethyl hexamethylene diisocyanates, 1,4-diisocyanatobutane, 1,2-diisocyanatododecane and dimer fatty acid diisocyanates. Triisocyanatoisocyanurates may be obtained by trimerization of diisocyanates at elevated temperature, for example at around 200° C., and/or in the presence of a catalyst, for example an amine, and may also be used for the purposes of the present invention. According to the invention, the polyisocyanates mentioned may be used either individually or in the form of a mixture of two or more of the polyisocyanates mentioned. A single polyisocyanate or a mixture of two or three polyisocyanates is preferably used for the purposes of the present invention. Preferred polyisocyanates used either individually or in admixture are HDI, MDI or TDI, for example a mixture of MDI and TDI.

In order to obtain a polymer suitable as component A from a polymer obtainable in this way, the polymer is preferably reacted with a compound containing both a functional group polymerizable by exposure to UV light or to electron beams and a functional group capable of reacting with the terminal functional group of the polymer. The hydroxyalkl acrylates or methacrylates, i.e. the reaction products of acrylic or methacrylic acid with dihydric alcohols, are particularly suitable for this purpose. For example, 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate or mixtures of two or more thereof are particularly suitable for the purposes of the present invention.

The molar ratio between the polymer and the compound containing both a functional group polymerizable by exposure to UV light or to electron beams and a functional group capable of reacting with the terminal functional group of the polymer may vary within wide limits during the reaction to form component A. In general, a larger number of functional groups polymerizable by exposure to UV light or to electron beams in component A leads to an adhesive bond of relatively high strength whereas a larger number of functional groups capable of reacting with a compound containing at least one acidic hydrogen atom leads to greater ultimate strength.

If, for example, in the first production process the polymer is reacted with the compound containing both a functional group polymerizable by exposure to UV light or to electron beams and a functional group capable of reacting with the terminal functional group of the polymer in a molar ratio of about 1:1, each polymer molecule in the resulting polymer mixture contains on average both a functional group polymerizable by exposure to UV light or to electron beams and a functional group capable of reacting with a compound containing at least one acidic hydrogen atom. The percentages of the two types of functional groups in the polymer mixture obtainable by such a reaction can be varied accordingly between greater than 0 and smaller than 100% (based on functional groups in the context of the present invention). Good results can be obtained, for example, if about 1 to about 50%, preferably about 5 to about 30% and, more preferably, about 8 to about 15% of the functional groups present as terminal groups in the polymer are functional groups polymerizable by exposure to UV light or to electron beams. Polymers of this type are particularly suitable for use as component A.

In a second production process, polymers suitable for use in component A may also be obtained in several steps, for example by reacting a corresponding basic polymer with a molecular weight ($M_n$) of about 5,000 or more in a first step with a compound containing both a functional group polymerizable by exposure to UV light or to electron beams and a functional group capable of reacting with the terminal OH group of the basic polymer. One example of such a compound is styrene isocyanate. Other compounds of this type can be obtained, for example, by reacting a substantially equimolar quantity of a hydroxyalkyl acrylate or methacrylate with a diisocyanate. The quantity of compound containing both a functional group polymerizable by exposure to UV light or to electron beams and a functional group capable of reacting with the terminal OH group of the basic polymer is determined by the required content of functional groups polymerizable by electron beams. A reaction of substantially equimolar quantities of both reactants leads to polymers containing on average about one functional group polymerizable by electron beams per molecule. This content can be reduced or increased accordingly by varying the molar quantities of reactants.

This reaction results in the formation of a polymer terminated both by an OH group and by a functional group polymerizable by UV light or electron beams. If this polymer is then reacted with an at least equimolar quantity of a compound containing a functional group reactive to the terminal OH group of the polymer and another functional group reactive to compounds containing an acidic hydrogen atom, a polymer suitable for use as component A is obtained. According to the invention, the polyisocyanates mentioned above are particularly suitable for this second reaction step.

In a third production process, two production steps may be combined in the production of component A. To this end, an OH-containing basic polymer with a molecular weight ($M_n$) of 5,000 or more, a polyisocyanate or a polyepoxide, more particularly a diisocyanate or a diepoxide, or a mixture thereof or optionally one or more other polyfunctional compounds as defined above and a compound containing both a functional group polymerizable by exposure to UV light or to electron beams and a functional group capable of reacting with the terminal OH group of the basic polymer are reacted with one another in a suitable molar ratio. The molar quantities are selected so that the percentage contents of both types of functional groups in the polymer mixture obtainable by such a reaction always vary between >0% and <100% (based on functional groups). In this case, too, good results can be obtained, for example, when about 1 to about 50%, preferably about 5 to about 30% and most preferably about 8 to about 15% of the functional groups present as terminal groups in the polymer are functional groups polymerizable by exposure to UV light or to electron beams.

If basic polymers with a molecular weight ($M_n$) of less than about 5,000 are used for the production of component A, the production conditions described above do not lead to the required goal because only a slight increase in molecular weight is obtained with the described processes.

Accordingly, the molecular weight of the basic polymer may have to be increased to produce the polymer suitable for use in the composition according to the invention. An increase in molecular weight can be obtained, for example, by chain extension of the basic polymer. To this end, the basic polymer is advantageously first reacted with a compound which is polyfunctional and preferably difunctional in relation to the terminal OH groups.

Suitable polyfunctional compounds for the purposes of the invention are in particular polyepoxides, particularly diepoxides, but preferably polyisocyanates, especially diisocyanates of the type already mentioned in the foregoing. Diisocyanates are particularly preferred for the purposes of the present invention. The stoichiometric ratios between the basic polymer and the polyfunctional compound required for obtaining a certain increase in molar weight are known to the expert.

In a preferred embodiment of the invention, chain extension is carried out with an excess of basic polymer in the chain extending reaction. By carrying out the reaction in this way, the chain-extended basic polymers formed contain the original type of terminal functional groups as terminal functional groups.

Accordingly, in a fourth production process for a polymer suitable for use as component A, an OH-containing basic polymer with a molecular weight ($M_n$) of less than 5,000 or a mixture of such OH-containing basic polymers is first reacted (chain-extended) with a suitable quantity of chain-extending agents, for example polyepoxides or polyisocyanates, preferably polyisocyanates, with the original type of terminal functional group remaining intact, the ratio of terminal functional groups in the basic polymer to functional groups in the chain extending agent being greater than 1. This chain extending reaction is followed by the reaction to form component A which may be carried out, for example, by one of the production processes already described.

In a fifth production process, the production of component A may be shortened, for example, by one step or may be carried out in a single step if a compound containing both a functional group polymerizable by exposure to UV light or to electron beams and a functional group capable of reacting with the terminal functional group of the basic polymer is present during the chain extending reaction.

Where this procedure is adopted, a polymer suitable for use as component A may be obtained, for example, by carrying out a reaction of the basic polymer with one or more compounds containing both a functional group polymerizable by exposure to UV light or to electron beams and a functional group capable of reacting with the terminal functional of the basic polymer at the same time as the chain extending reaction, for example with one or more of the above-mentioned polyisocyanates. To this end, the reactants are reacted in a suitable molar ratio.

In a sixth production process, the starting material is a basic polymer with a molecular weight ($M_n$) of 5,000 or more which has been produced using one or more components containing functional groups polymerizable by UV light or electron beams. To produce a polymer such as this suitable for use as component A, the corresponding basic polymer is reacted with a compound which contains both a group reactive to the terminal functional groups of the basic polymer as a first functional group and a functional group reactive to a compound containing an acidic hydrogen atom as a second functional group. In general, the first and second functional groups will fulfil both conditions. However, if the first and second functional groups differ in their reactivity for example, it is possible by suitably selecting the reaction conditions to achieve a selective reaction, for example of the first functional group with the terminal groups of the basic polymer, while the second functional group does not react with the terminal functional group of the basic polymer. One example of such a combination of first and second functional groups is, for example, the combination of an epoxy group and an NCO group. In this case, the reaction is carried out, for example, with a molar ratio of basic polymer to the corresponding compound of about 1:>2.

A seventh production process for polymers suitable for use as component A is carried out in exactly the same way as the sixth production process except that the molar ratio of basic polymer to the compound which contains both a group reactive to the terminal functional groups of the basic polymer as a first functional group and a functional group reactive to a compound containing an acidic hydrogen atom as a second functional group is selected so that, providing the reaction is suitably carried out (both functional groups of the compound must react with the terminal groups of the basic polymer), chain extension to the required molecular weight occurs.

In the last two of the processes mentioned above, basic polymers containing about 2 to about 5 functional groups polymerizable by UV light or electron beams per polymer molecule are preferably used.

Component A usable in accordance with the invention may contain, for example, only one of the polymers mentioned above. However, mixtures of two or more of the polymers mentioned may also be used as component A.

Typical polymers suitable for use in component A have a viscosity at processing temperatures suitable for typical applications in the range from about 3,000 mPas to about 20,000 mPas and preferably in the range from about 5,000 mPas to about 15,000 mPas at about 80 to about 180° C. and more particularly at about 100 to about 140° C. (Brookfield CAP 200, cone 6, 50 r.p.m., measuring time 25 s). Typical processing temperatures are, for example, about 100° C. to about 150° C., more particularly about 110 to about 140° C., for example about 120 to about 130° C., for example in the production of flexible paperboard boxes.

Typical NCO contents for polymers suitable for use as component A are about 0.5% by weight to about 10% by weight and more particularly about 3.5% by weight to about 5% by weight.

"Component B" in the context of the present invention is a polymer with a molecular weight ($M_n$) of at least 5,000 which contains at least one functional group reactive with a compound containing an acidic hydrogen atom and no functional group polymerizable by exposure to UV light or to electron beams.

To produce a polymer suitable for use as component B, the basic polymer is reacted with a compound which contains both a group reactive with the terminal functional groups of the basic polymer as a first functional group and a functional group reactive with a compound containing an acidic hydrogen atom as a second functional group. In general, the first and second functional groups will fulfill both conditions. However, if the first and second functional groups differ in their reactivity for example, it is possible by suitably selecting the reaction conditions to achieve a selective reaction, for example of the first functional group with the OH groups of the basic polymer, while the second functional group does not react with the terminal functional group of the basic polymer. One example of such a combination of first and second functional groups is, for example, the combination of an epoxy group and an NCO group.

The polymer suitable for use as component B is preferably produced by reacting a basic polymer or a mixture of two or more basic polymers with a compound containing at least two groups reactive to the terminal functional groups. The molar ratio in which the reactants are used is selected, for example, so that, on completion of the reaction, hardly any more OH groups are present in the reaction mixture. The molecular weight of the basic polymer may be too low to achieve the molecular weight of about 5,000 ($M_n$) required for use as component B after a reaction with the compound bearing at least two OH-reactive functional groups. In this case, the ratio between the compound bearing at least two OH-reactive functional groups and the H groups of the basic polymer and optionally the reaction conditions (if the compound bearing at least two OH-reactive functional groups contains two functional groups differing in their reactivity) are selected so that a chain extension of the basic polymer or the mixture of two or more basic polymers takes place.

In a preferred embodiment of the invention, the basic polymer or the mixture of two or more basic polymers is reacted with a polyisocyanate, more particularly a diisocyanate.

Component B usable in accordance with the invention may contain, for example, only one of the polymers mentioned above. However, mixtures of two or more of the polymers mentioned may also be used as component B.

Since the polymer usable as component B is not supposed to contain a functional group polymerizable by UV light or electron beams apart from the at least one functional group reactive to a compound containing an acidic hydrogen atom, no basic polymers which have been produced using olefinically unsaturated components may be used in the production of the polymers usable as component B.

The polymer usable as component B has a content of NCO groups of about 0.5 to about 10% by weight and more particularly of about 2.5 to about 5% by weight.

The viscosity of the polymer usable as component B at typical processing temperatures is in the range from about 2,000 to about 60,000 mPas and more particularly in the range from about 4,000 to about 20,000 mPas (Brookfield RVT D, spindle 27, 110 to 130° C.).

Typical processing temperatures are in the range from about 100 to about 150° C. and more particularly in the range from about 110 to about 140° C., for example in the range from about 120 to about 130° C., for example in the production of flexible paperboard boxes.

The polymer component used as component A or B may consist of only one of the described polymers, although it may advantageously represent a mixture of two or more of the polymers mentioned. For example, it is of advantage to use a mixture of one or more polyester polyols and one or more polyether polyols as the basic polymer. The various basic polymers may differ, for example, in their molecular weights ($M_n$) or in their chemical compositions or in both.

For example, about 20 to about 40% by weight of polyester polyols and about 20 to about 60% by weight of polyether polyols, based on component A or B as a whole, may be used as the basic polymers for the production of component A or B. In another preferred embodiment, at least two different polyether polyols, for example a mixture of a polyether polyol with a molecular weight of about 800 to about 1,500 and a polyether polyol with a molecular weight of about 300 to about 700, are used in addition to a polyester polyol as the basic polymer.

In another preferred embodiment, however, a preferably difunctional polyester terminated by OH groups or a mixture of two or more such polyesters is exclusively used as the basic polymer for the production of component A or B. An at least partly crystalline polyester or a mixture of two or more polyesters, of which at least one is crystalline or partly crystalline, is advantageously selected as the basic polymer.

A polymer is "crystalline" or "partly crystalline" in the context of the present specification when, in differential scanning calorimetry (DSC), it shows at least one first-order thermal transition, i.e. at least one enthalpic transition, which can be assigned to a melting process.

Crystalline or at least predominantly crystalline polyesters can be obtained, for example, by polycondensation of polyfunctional aromatic carboxylic acids or their anhydrides (where they exist) with short-chain aliphatic diols containing about 2 to about 6 carbon atoms. Partly crystalline polyesters can be obtained, for example, by using alcohols with a larger number of carbon atoms or branched or unsaturated, more particularly cis-unsaturated alcohols.

Suitable aromatic carboxylic acids are phthalic acid, phthalic anhydride, terephthalic acid, trimellitic acid, trimellitic anhydride, tetrachlorophthalic acid, tetrachlorophthalic anhydride or naphthalene dicarboxylic acid.

Suitable alcohols are, for example, ethylene glycol, propane-1,2-diol, propane-1,3-diol, butane-1,4-diol, butane-1,3-diol, butane-2,3-diol, butene-1,4-diol, butine-1,4-diol, pentane-1,5-diol, and the isomeric pentanediols, pentenediols or pentinediols or mixtures of two or more thereof, hexane-1,6-diol and the isomeric hexanediols, hexenediols or hexinediols or mixtures of two or more thereof, heptane-1,7-diol and the isomeric heptane, heptene or heptinediols, octane-1,8-diol and the isomeric octane, octene or octinediols and higher homologs or isomers of the compounds mentioned, which are obtained in known manner from a step-by-step extension of the hydrocarbon chain by one $CH_2$ group at a time or by introducing branches into the carbon chain, or mixtures of two or more thereof. If the polyesters are to have crystalline properties, branched alcohols should not be used. To produce partly crystalline polyesters, branched alcohols may be present in different quantities during the polycondensation.

In a preferred embodiment of the present invention, a partly crystalline polyester or a mixture of partly crystalline polymers or a mixture of crystalline and partly crystalline polyesters or a mixture of crystalline and amorphous polyesters or a mixture of partly crystalline and amorphous polyesters or a mixture of crystalline, partly crystalline and amorphous polyesters with a crystallinity of about 1 to about 70%, for example of about 5 to about 50% and more particularly of about 10 to about 30% (based on the polymer or the mixture) is used as the basic polymer containing OH groups.

"Component C" in the context of the present invention is a compound containing a functional group polymerizable by UV light or electron beams and having a molecular weight of less than 5,000.

In a preferred embodiment of the invention, the compound usable as component C has a molecular weight of about 80 to about 3,000 and more particularly in the range from about 100 to about 1,000.

Acrylate or methacrylate esters containing one or more olefinically unsaturated double bonds, for example, are suitable as component C. Corresponding acrylate or methacrylate esters include, for example, esters of acrylic acid or methacrylic acid with aromatic or linear or branched, saturated or unsaturated aliphatic or cycloaliphatic monoalcohols and acrylate esters of polyether monoalcohols.

In a preferred embodiment of the present invention, component C is, for example, an ester of acrylic or methacrylic acid with aromatic or linear or branched, saturated or unsaturated $C_{6-24}$ alcohols. Examples of such esters are esters of acrylic or methacrylic acid with hexyl, heptyl, octyl or 2-ethyl hexyl alcohol. The esters of acrylic or methacrylic acid with phenol, methyl phenol or benzyl alcohol are also suitable, as are the esters of acrylic or methacrylic acid with fatty alcohols, for example caproic alcohol, caprylic alcohol, 2-ethyl hexyl alcohols, such as capric alcohol, lauryl alcohol, isotridecyl alcohol, myristyl alcohol, cetyl alcohol, palmitoleyl alcohol, stearyl alcohol, isostearyl alcohol, oleyl alcohol, elaidyl alcohol, petroselinyl alcohol, behenyl alcohol, erucyl alcohol and brassidyl alcohol and the technical mixtures thereof obtained, for example, in the high-pressure hydrogenation of technical methyl esters based on fats and oils or aldehydes from Roelen's oxosynthesis and as monomer fraction in the dimerization of unsaturated fatty alcohols.

Acrylate or methacrylate esters with a functionality of two or higher are also suitable as component C. Corresponding acrylate or methacrylate esters include, for example, esters of acrylic acid or methacrylic acid with aromatic, aliphatic or cycloaliphatic polyols containing at least two OH groups and acrylate or methacrylate esters of polyether alcohols containing at least two OH groups.

Various polyols may be used as the polyols for producing an acrylate or methacrylate ester suitable for use as component C. Examples of such polyols are aliphatic polyols containing 2 to 40H groups per molecule and 2 to about 40 carbon atoms. The OH groups may be both primary and secondary OH groups. Suitable aliphatic polyols include, for example, ethylene glycol, propane-1,2-diol, propane-1,3-diol, butane-1,4-diol, butane-1,3-diol, butane-2,3-diol, butene-1,4-diol, butine-1,4-diol, pentane-1,5-diol, and the isomeric pentanediols, pentenediols or pentinediols or mixtures of two or more thereof, hexane-1,6-diol and the isomeric hexanediols, hexenediols or hexinediols or mixtures of two or more thereof, heptane-1,7-diol and the isomeric heptane, heptene or heptinediols, octane-1,8-diol and the isomeric octane, octene or octinediols and higher homologs or isomers of the compounds mentioned, which are obtained in known manner from a step-by-step extension of the hydrocarbon chain by one $CH_2$ group at a time or by introducing branches into the carbon chain, or mixtures of two or more thereof.

Other suitable polyols are alcohols of relatively high functionality such as, for example, glycerol, trimethylol propane, pentaerythritol or sugar alcohols, such as sorbitol or glucose, and oligomeric ethers of the substances mentioned either as such or in the form of a mixture of two or more of the compounds mentioned with one another, for example polyglycerol with a degree of polymerization of about 2 to about 4. In the alcohols of relatively high functionality, one or more OH groups may be esterified with monobasic carboxylic acids containing 1 to about 20 carbon atoms, with the proviso that, on average, at least two OH groups remain intact. The higher alcohols mentioned may be used in pure form or, where possible, in the form of the technical mixtures obtainable in the course of their synthesis.

The reaction products of low molecular weight polyfunctional alcohols with alkylene oxides, so-called polyether polyols, may also be used as the polyol component for producing the (meth)acrylate esters. Polyether polyols, which are to be used for the production of polyesters suitable as the basic polymers, are preferably obtained by reaction of polyols with alkylene oxides. The alkylene oxides preferably contain 2 to about 4 carbon atoms. Suitable polyether polyols are, for example, the reaction products of ethylene glycol, propylene glycol, the isomeric butanediols or hexanediols, as mentioned above, or mixtures of two or more thereof with ethylene oxide, propylene oxide or butylene oxide or mixtures of two or more thereof. Other suitable polyether polyols are products of the reaction of polyfunctional alcohols, such as glycerol, trimethylol ethane or trimethylol propane, pentaerythritol or sugar alcohols or mixtures of two or more thereof, with the alkylene oxides mentioned to form polyether polyols. Polyether polyols with a molecular weight ($M_n$) of about 100 to 2,000, preferably in the range from about 150 to about 1,500 and more preferably in the range from about 150 to about 800 are particularly suitable.

Acrylate esters of aliphatic diols containing 2 to about 40 carbon atoms include, for example, neopentyl glycol di(meth)acrylate, 1,6-hexanediol di(meth)acrylate, trimethylol propane tri(meth)acrylate, pentaerythritol tetra (meth)acrylate and (meth)acrylate esters of sorbitol and other sugar alcohols. These (meth)acrylate esters of aliphatic or cycloaliphatic diols may be modified with an aliphatic ester or an alkylene oxide. The acrylates modified by an aliphatic ester comprise, for example, neopentyl glycol hydroxypivalate di(meth)acrylate, caprolactone-modified neopentyl glycol hydroxypivalate di(meth)acrylates and the like. The alkylene oxide-modified acrylate compounds include, for example, ethylene oxide-modified neopentyl glycol di(meth)acrylates, propylene oxide-modified neopentyl glycol di(meth)acrylates, ethylene oxide-modified 1,6-hexanediol di(meth)acrylates or propylene oxide-modified hexane-1,6-diol di(meth)acrylates or mixtures of two or more thereof.

Acrylate monomers based on polyether polyols comprise, for example, neopentyl glycol-modified trimethylol propane di(meth)acrylates, polyethylene glycol di(meth)acrylates, polypropylene glycol di(meth)-acrylates and the like. Trifunctional and higher acrylate monomers comprise, for example, trimethylol propane tri(meth)acrylate, pentaerythritol tri(meth)acrylate, dipentaerythritol tetra(meth)acrylate, dipentaerythritol penta(meth)acrylate, dipentaerythritol hexa(meth)acrylate, caprolactone-modified dipentaerythritol hexa(meth)acrylate, pentaerythritol tetra(meth)-acrylate, tris [(meth)acryloxyethyl]-isocyanurate, caprolactone-modified tris[(meth)acryloxyethyl]-isocyanurates or trimethylol propane tetra(meth)-acrylate or mixtures of two or more thereof.

In a preferred embodiment of the invention, phenyl acrylate, phenyl methacrylate or phenoxyethyl acrylate, for example, is used as component C.

Of the above-mentioned difunctional, trifunctional or higher acrylate monomers which may be used in accordance with the invention as component C, tripropylene glycol diacrylate, neopentyl glycol propoxylate di(meth)acrylate, trimethylol propane tri(meth)acrylate and pentaerythritol triacrylate are preferred.

In another preferred embodiment of the present invention, component C is a compound selected from the group consisting of monomeric, oligomeric or polymeric esters of acrylic acid, methyl acrylic acid, ethyl acrylic acid, propyl acrylic acid or butyl acrylic acid with an aromatic or aliphatic monohydric or polyhydric alcohol, the ester having a boiling point of at least 100° C.

In addition to the combinations of components A, B and C mentioned at the beginning, the hotmelt adhesive according to the invention may contain a photoinitiator which initiates a polymerization of olefinically unsaturated double bonds on exposure to UV light as component D. This is of advantage in particular when the adhesive is to be polymerized by exposure to UV light.

Accordingly, in cases such as these, a photoinitiator capable of initiating the radical polymerization of olefinically unsaturated double bonds on exposure to light with a wavelength of about 260 to about 480 nm is used as component D. In principle, any commercially available photoinitiators which are compatible with the adhesive according to the invention, i.e. which form at least substantially homogeneous mixtures, may be used for the purposes of the present invention.

Commercially available photoinitiators such as these are, for example, any Norrish-type I fragmenting substances, for example benzophenone, camphor quinone, Quantacure (a product of International Bio-Synthetics), Kayacure MBP (a product of Nippon Kayaku), Esacure BO (a product of Fratelli Lamberti), Trigonal 14 (a product of Akzo), photoinitiators of the Irgacure®, Darocure® or Speedcure® series (products of Ciba Geigy), Darocure® 1173 and/or Fi-4 (made by the Eastman Company). Of these, Irgacure® 651, Irgacure® 369, Irgacure® 184, Irgacure® 907, Irgacure® 1850, Irgacure® 1173 (Darocure® 1173), Irgacure® 1116, Speedcure® EDB, Speedcure® ITX, Irgacure® 784 or. Irgacure® 2959 or mixtures of two or more thereof are particularly suitable.

Conventional low molecular weight photoinitiators may contribute to the formation of "migrates" in laminates. Migrates include the photoinitiators themselves present in the adhesive and also fragments of the photoinitiators which can be formed on exposure of the adhesive to UV light. In certain circumstances, for example in the production of laminates intended for the packaging of foods, the presence of migratable compounds in the adhesive should be avoided. The content of migratable compounds in the adhesive according to the invention can generally be further reduced if the photoinitiator has a molecular weight which makes migration very difficult or even impossible.

Accordingly, in a preferred embodiment, component D at least partly contains a photoinitiator with a molecular weight of more than about 200. Commercially available photoinitiators which meet this requirement are, for example, Irgacure® 651, Irgacure® 369, Irgacure® 907, Irgacure® 784, Speedcure® EDB and Speedcure® ITX.

However, photoinitiators which meet the above-stated requirement in regard to their molecular weight can also be obtained by reacting a low molecular weight photoinitiator containing an isocyanate-reactive functional group, for example an amino group or an OH group, with a high molecular weight compound containing at least one isocyanate group (polymer-bound photoinitiators). Compounds containing more than one photoinitiator molecule, for example two, three or more photoinitiator molecules, are preferably used as the photoinitiator. Compounds such as these can be obtained, for example, by reacting a polyfunctional alcohol containing two or more OH groups with suitable diisocyanates or triisocyanates and photo-initiators containing a suitable isocyanate-reactive functional group.

Suitable polyfunctional alcohols are any of the polyfunctional alcohols mentioned above, but especially neopentyl glycol, glycerol, trimethylol propane, pentaerythritol and alkoxylation products thereof with $C_{2-4}$ alkylene oxides. Other suitable and, according to the invention, particularly preferred polyfunctional alcohols are the reaction products of trihydric alcohols with caprolactone, for example the reaction product of trimethylol propane with caprolactone (Capa 305, a product of Interox, Cheshire, UK; molecular weight ($M_n$)≈540).

In another preferred embodiment of the present invention, component D contains a photoinitiator obtainable by reacting an at least trihydric alcohol with caprolactone to form a polycaprolactone containing at least three OH groups with a molecular weight of about 300 to about 900 and then linking the polycaprolactone to 1-[4-(2-hydroxyethoxy)-phenyl]-2-hydroxy-2-methylpropan-1-one by means of a compound containing at least two isocyanate groups.

Suitable compounds containing at least two isocyanate groups, more particularly suitable diisocyanates, for reaction with the polyols mentioned are, for example, any of the diisocyanates mentioned in the present specification. However, the 2,4-isomer and the 2,6-isomer of TDI are particularly preferred, the isomers being used either in their pure form or in the form of a mixture.

Suitable photoinitiators for producing the polymer-bound photoinitiators are any photoinitiators which contain an isocyanate-reactive functional group. 1-[4-(2-hydroxyethoxy)-phenyl]-2-hydroxy-2-methylpropan-1-one (Irgacure® 2959), which has one primary OH group, is particularly preferred for the purposes of the present invention.

The photoinitiators used in component D may also be prepared by using a small quantity of photoinitiator molecules reactive to isocyanate groups in the production of component A or component B or in both production processes. In this way, the photoinitiator is attached to a molecule of component A or component B.

The photoinitiator may also be attached to a polymer chain, for example to component A or component B, by adding the photoinitiator containing a corresponding functional group to the adhesive in monomeric form and then reacting it with a corresponding polymeric component, for example component A or component B.

It is also possible to provide the photoinitiator with a functional group polymerizable by exposure to UV light or to electron beams, in which case the functional group polymerizable by exposure to UV light or to electron beams can be attached to the photoinitiator, for example by reaction of the photoinitiator with an unsaturated carboxylic acid. Suitable unsaturated carboxylic acids are, for example, acrylic acid and methacrylic acid. The reaction products of Irgacure® 2959 with acrylic acid or methacrylic acid are particularly suitable for the purposes of the invention.

Accordingly, a compound which contains both a photoinitiator and a functional group polymerizable by exposure to UV light or to electron beams or a functional group capable of reacting with a compound containing at least one acidic hydrogen atom may be used as component D.

Besides the combinations of components A, B, C and D mentioned above, the adhesive according to the invention may contain other additives as component E.

The additives collectively suitable for use as component E in accordance with the invention include, for example, plasticizers, stabilizers, antioxidants, dyes, fillers, catalysts, accelerators, defoamers and flow controllers.

The plasticizers used are, for example, plasticizers based on phthalic acid, more especially dialkyl phthalates, preferred plasticizers being phthalic acid esters which have been esterified with a linear alkanol containing about 6 to about 12 carbon atoms. Dioctyl phthalate is particularly preferred.

Other suitable plasticizers are benzoate plasticizers, for example sucrose benzoate, diethylene glycol dibenzoate and/or diethylene glycol benzoate, in which around 50 to around 95% of all the hydroxyl groups have been esterified, phosphate plasticizers, for example t-butyl phenyl diphenyl phosphate, polyethylene glycols and derivatives thereof, for example diphenyl ethers of poly(ethylene glycol), liquid resin derivatives, for example the methyl ester of hydrogenated resin, vegetable and animal oils, for example glycerol esters of fatty acids and polymerization products thereof.

The stabilizers or antioxidants suitable for use as additives in accordance with the present invention include phenols, sterically hindered phenols of high molecular weight ($M_n$), polyfunctional phenols, sulfur- and phosphorus-containing phenols or amines. Phenols suitable for use as additives in accordance with the invention are, for example, hydroquinone, hydroquinone methyl ether, 2,3-(di-tert.butyl)-hydroquinone, 1,3,5-trimethyl-2,4,6-tris-(3,5-di-tert.butyl-4-hydroxybenzyl)-benzene; pentaerythritol tetrakis-3-(3,5-ditert.butyl-4-hydroxyphenyl)-propionate; n-octadecyl-3,5-ditert.-butyl-4-hydroxyphenyl)-propionate; 4,4-methylene-bis-(2,6-di-tert.butyl phenol); 4,4-thiobis-(6-tert.butyl-o-cresol); 2,6-di-tert.butylphenol; 6-(4-hydroxy-phenoxy)-2,4-bis-(n-octylthio)-1,3,5-triazine; di-n-octadecyl-3,5-di-tert.butyl-4-hydroxybenzyl phosphonates; 2-(n-octylthio)-ethyl-3,5-ditert.butyl-4-hydroxybenzoate; and sorbitol hexa [3-(3,5-ditert.butyl-4-hydroxyphenyl)-propionate]; and p-hydroxydiphenylamine or N,N'-diphenylenediamine or phenothiazine.

Other additives may be incorporated in the adhesive A in order to vary certain properties. These other additives include, for example, dyes, such as titanium dioxide, fillers, such as talcum, clay and the like. The adhesives according to the invention may optionally contain small quantities of thermoplastic polymers, for example ethylene/vinyl acetate (EVA), ethylene/acrylic acid, ethylene/methacrylate and ethylene/n-butyl acrylate copolymers which optionally impart additional flexibility, toughness and strength to the adhesive. Certain hydrophilic polymers may also be added, including for example polyvinyl alcohol, hydroxyethyl cellulose, hydroxypropyl cellulose, polyvinyl methyl ether, polyethylene oxide, polyvinyl pyrrolidone, polyethyl oxazolines or starch or cellulose esters, more particularly the acetates with a degree of substitution of less than 2.5. These hydrophilic polymers increase the wettability of the adhesives for example.

The adhesive according to the invention may contain the described components either individually or, for example, in the following combinations: component A, components A and B, components A and C, components B and C, components A and D, components A and E, components A, B and C, components B, C and D, components B, C and E, components A, B, C and D, components A, B, C and E, components A, C, D and E, components B, C, D and E and components A, B, C, D and E.

If a combination containing component A is required, the adhesive according to the invention contains this component in a quantity of up to about 100% by weight, based on the hotmelt adhesive as a whole. If component A is not used on its own, the hotmelt adhesive according to the invention contains up to about 99.99% by weight of component A. In this case, the lower limit to the content of component A should be at least about 0.01% by weight.

If a combination containing component B is required, the adhesive according to the invention contains this component in a quantity of up to about 99% by weight, based on the hotmelt adhesive as a whole. In one particular embodiment, the hotmelt adhesive according to the invention contains about 10% by weight to about 98% by weight and more particularly about 80% by weight to about 95% by weight of component B. The lower limit to the content of component B where it is used should be at least about 0.01% by weight.

If a combination containing component C is required, the adhesive according to the invention contains this component in a quantity of up to about 50% by weight, based on the hotmelt adhesive as a whole. In one particular embodiment, the hotmelt adhesive according to the invention contains about 2% by weight to about 40% by weight and more particularly about 5% by weight to about 30% by weight of component C. The lower limit to the content of component C where it is used should be at least about 0.01% by weight.

If a combination containing component D is required, the adhesive according to the invention contains this component in a quantity of up to about 50% by weight, based on the hotmelt adhesive as a whole. In this case, the lower limit should be about 0.01% by weight. Based on the individual photoinitiator molecule in component D itself (irrespective of whether it is covalently bonded to another compound), component D should make up at least about 0.01% by weight to about 10% by weight, preferably about 0.5 to about 5% by weight and most preferably about 1 to about 3% by weight of the adhesive as a whole.

In a preferred embodiment, the hotmelt adhesive according to the invention contains components A, B, C, D and E in the above-mentioned combinations in such a ratio that a shaped body consisting of the hotmelt adhesive is dimensionally stable at room temperature.

The expression "dimensionally stable at room temperature" describes a condition in which a shaped body consisting of the hotmelt adhesive according to the invention retains or at least largely retains its external shape at 20° C., a negligible change of shape being reflected solely in a change of structures with little three-dimensional extent, for example in a slight rounding of the corners of a cube or the like made from the composition according to the invention. At the same time, however, "dimensionally stable" means that the composition can exhibit plastic behavior under externally acting forces (cold stretching, cold flow).

The present invention also relates to a process for the production of a laminate comprising at least two layers, in which a hotmelt adhesive according to the invention is applied to a first side of a first layer at a temperature of at least 40° C., a second layer is then laminated onto the adhesive side of the first layer and the material thus obtained is then treated by exposure to UV light or electron beams.

In the process according to the invention, the hotmelt adhesive according to the invention is generally processed by application of the molten adhesive to the first layer and optionally other layers by standard methods of application, for example using rollers, slot dies, spray nozzles, screen printing, dipping or engraved rollers.

In a preferred embodiment of the process according to the invention, the treatment with UV light or electron beams is carried out at a temperature of more than 30° C., more particularly at a temperature of more than 50° C.

The adhesive hardens after the first hardening stage initiated by cooling and the second hardening stage initiated by electron bombardment and even further in a third hardening stage through the presence of at least one functional group reactive to a compound containing an acidic hydrogen atom. This will generally be attributable to a reaction of the groups mentioned with moisture, for example atmospheric moisture. Further hardening generally takes place over a relatively long period, for example of about one day or a few days up to about one week or longer, for example about two weeks, at ambient temperature (about 15 to about 25° C.).

However, the third hardening stage may also be influenced in its rate, for example, by changing the moisture conditions or increasing the temperature or both either at the same time or successively. This may be done either immediately after the electron beam treatment or at some time thereafter.

The present invention also relates to an at least two-layer laminate with a thickness exceeding that of the materials typically used in film lamination, a firm union between at least two of the layers being established by a hotmelt adhesive according to the present invention. The thickness of such materials is generally more than about 200 μm, for example more than about 250 or about 300 μm. The thickness of such materials may even be greater than about 400, 500, 600 or greater than about 800 μm.

The hotmelt adhesive according to the invention is also preferably used for the production and closure of folding boxes for high-stress applications, for example for ready-to-bake meals, baby foods, cosmetics, pharmaceuticals, beverages, sterilization packs, such as medical instruments and dressings. Hitherto, thermoplastic hotmelts or dispersions have been used for such applications. The disadvantage of this was that only limited functionality could be achieved on account of the thermoplasticity of the box, with the result that an inner bag had to be used, for example for high-temperature and low-temperature applications.

By virtue of the crosslinked adhesive system according to the invention, high-stress packs without no inner bag can be made, filled and closed using conventional machines which merely have to be equipped with a source of UV light or electron beams. In addition, the production process has one less step, i.e. the "bagging" step. The outer pack or the outer box thus assumes the character of a functional pack and may thus be differently evaluated both in economic and in ecological terms.

The invention is illustrated by the following Examples.

EXAMPLES

An adhesive according to the invention was prepared as follows:

700 g of a first polyester (OH value=60) and 100 g of a second polyester (OH value=30) prepared from the components phthalic acid, isophthalic acid, terephthalic acid, diethylene glycol, dipropylene glycol, hexanediol and butanediol and 20 g of MDI were introduced into a reactor and subjected to polyaddition for 30 minutes at 120° C. 100 g of phenoxyethyl acrylate were then added and the polyaddition reaction was continued for another 30 minutes. The NCO-terminated prepolymer formed had a viscosity of ca. 10,000 mPas at 120° C.

The product was dimensionally stable at room temperature and had a melting point of more than about 80° C. 5% by weight of a photoinitiator were added to part of the prepolymer. This product (Example 1) was applied at 120° C. to an SiOx-metallized PETP film which was then laminated with a PETP film and an $SiO_x$-metallized PETP film. The adhesive was exposed to 400 watt/cm² UV light (Hg vapor) (for results, see Table).

A second part of the prepolymer was applied to the above-mentioned films at 120° C. with no addition of photoinitiator (Example 2) and, after application, the adhesive was exposed to a 2 megarad electron beam (for results, see Table).

| Laminate | Laminate adhesion, non-irradiated, N/15 mm | Laminate adhesion, UV N/15 mm | Laminate adhesion, EB N/15 mm | Laminate adhesion, 1 d non-irradiated N/15 mm | Laminate adhesion, 1 d irradiated N/15 mm | Laminate adhesion, 1 h non-irradiated N/15 mm | Laminate adhesion, 1 W irradiated N/15 mm |
|---|---|---|---|---|---|---|---|
| Results of UV and EB hardening | | | | | | | |
| PETP$_{SiOx/SiOx}$PETP | 0.9 Tacky | 4.5 Tacky | 5 Tacky | 15 Tacky | 6.3 Material failure | 6.1 Material failure | 10 Material failure |
| PETP$_{SiOx}$/PETP | 1 Tacky | 8 Tacky | 7.8 Tacky | 24 Tacky | 11 Material failure | 7–11 Variable | 19 Material failure |

It can be seen from the Table that the composition according to the invention, through its character of a hotmelt adhesive, provides for strong early adhesion. This is characterized by rapid development of adhesion (in a few seconds) through irradiation and by the rapid formation of a crosslinked film (material failure after one day). In addition, the laminates thus produced show strong ultimate adhesion through the final isocyanate hardening process.

What is claimed is:

1. A hotmelt adhesive with a melting point of at least 40° C. comprising
    (i) Component A and Component B; or
    (ii) Component B and Component C; or
    (iii) Component A and Component C; or
    (iv) Component A, Component B and Component C;
  wherein:
    Component A is a polymer with a number average molecular weight of at least 5,000 which contains at least one functional group reactive with a compound containing an acidic hydrogen atom and a functional group polymerizable by exposure to UV rays or electron beams;
    Component B is a polymer with a number average molecular weight of at least 5,000 which contains at least one functional group reactive with a compound containing an acidic hydrogen atom but no functional group polymerizable by exposure to UV rays or electron beams; and
    Component C is a compound containing at least one functional group polymerizable by exposure to UV light or electron beams and having a number average molecular weight of less than 5,000.

2. The hotmelt adhesive of claim 1 wherein the hotmelt adhesive has a melting point of at least 60° C.

3. The hotmelt adhesive of claim 1 wherein the hotmelt adhesive has a viscosity of 5,000 to 15,000 mPas (Brookfield RVT D, spindle 27) at 120° C. to 180° C.

4. The hotmelt adhesive of claim 1 wherein the hotmelt adhesive comprises Component C this Component comprises at least one compound having a boiling point of at least 100° C. which is selected from the group consisting of monomeric, oligomeric or polymeric esters of acrylic acid, methyl acrylic acid, ethyl acrylic acid, propyl acrylic acid or butyl acrylic acid with an aromatic or aliphatic monohydric or polyhydric alcohol.

5. The hotmelt adhesive of claim 1 wherein Component A or Component B or both Component A and Component B comprise a polyurethane.

6. The hotmelt adhesive of claim 1 wherein Component A or Component B or both Component A and Component B comprise a polyurethane obtained by reacting an at least difunctional isocyanate with a crystalline or partly crystalline polymer or a mixture of two or more polymers, at least one of said polymers being crystalline.

7. The hotmelt adhesive of claim 1 wherein the hotmelt adhesive comprises, Component A and Component B, wherein one component contains at least one functional group selected from the group consisting of NCO, epoxy, anhydride, carboxyl and combinations thereof.

8. The hotmelt adhesive of claim 1 wherein the hotmelt adhesive is additionally comprised of at least one photo initiator which initiates a polymerization of olefinically unsaturated double bonds on exposure to UV light.

9. A process for producing a laminate comprising a) applying the hotmelt adhesive of claim 1 to a first side of a first layer at a temperature of at least 40° C., b) laminating a second layer to the first side of the first layer having the hotmelt adhesive applied thereon, and c) exposing the hotmelt adhesive to UV light or electron beams.

10. The process of claim 9 wherein step c) is carried out at a temperature above 30° C.

11. The process of claim 9 wherein step c) is carried out at a temperature above 50° C.

12. The process of claim 9 comprising an additional step d) wherein the hotmelt adhesive is exposed to moisture following step c).

13. The process of claim 9 wherein the first layer and the second layer each have a thickness of greater than about 200 μm.

14. A laminate comprised of a first layer, a second layer, and, between said first layer and said second layer, the hotmelt adhesive of claim 1.

15. The laminate of claim 14 wherein the first layer and the second layer each have a thickness of greater than about 200 μm.

16. A folding box for a high stress application comprising the hotmelt adhesive of claim 1.

17. The hotmelt adhesive of claim 1 further comprising:
    (i) up to 99.99% by weight of component A
    (ii) up to 99% by weight of component B
    (iii) up to 50% by weight of component C wherein the percent by weight is based on the hotmelt adhesive as a whole.

18. The hotmelt adhesive of claim 1 further comprising at least one member selected from the group consisting of photoinitators plasticizers, stabilizers, antioxidants, dyes, fillers, catalysts, accelerators, defoamers and flow controllers.

19. The hotmelt adhesive of claim 18 wherein the photoinitator contains a functional group polymerizable by exposure to UV light or to an electron beam.

20. The hotmelt adhesive of claim 18 further comprising:
    (i) up to 99.99% by weight of component A
    (ii) up to 99% by weight of component B
    (iii) up to 50% by weight of component C wherein the percent by weight is based on the hotmelt adhesive as a whole.

* * * * *